Nov. 14, 1967   J. W. SWINEFORD   3,352,456
COMBINED PRESSURE REGULATING AND CARTRIDGE PIERCING ASSEMBLY
Filed Jan. 3, 1966

INVENTOR.
JOHN W. SWINEFORD
BY
ATTORNEY

Nov. 14, 1967       J. W. SWINEFORD       3,352,456
COMBINED PRESSURE REGULATING AND CARTRIDGE PIERCING ASSEMBLY
Filed Jan. 3, 1966
2 Sheets-Sheet 2

INVENTOR.
JOHN W. SWINEFORD
BY
ATTORNEY

United States Patent Office 3,352,456
Patented Nov. 14, 1967

3,352,456
COMBINED PRESSURE REGULATING AND
CARTRIDGE PIERCING ASSEMBLY
John W. Swineford, Glenshaw, Pa., assignor to Goss Gas,
Inc., Glenshaw, Pa., a corporation of Pennsylvania
Filed Jan. 3, 1966, Ser. No. 518,251
6 Claims. (Cl. 222—5)

ABSTRACT OF THE DISCLOSURE

This invention relates to pressure regulating and cartridge piercing apparatus, and more particularly to a combined pressure regulating and cartridge piercing assembly for use in fluid dispensing apparatus of the type wherein a cartridge containing compressed gas is employed as a source of pressure.

---

As an overall object, the present invention seeks to provide improvements in pressure regulating and cartridge piercing apparatus.

Another object of the invention is to provide a combined pressure regulating and cartridge piercing assembly of compact design.

Still another object of the invention is to provide a combined pressure regulating and cartridge piercing assembly having means for readily and easily adjusting the pressure level at which the pressure regulator operates.

A further object of the invention is to provide a combined pressure regulating and cartridge piercing assembly which is relatively inexpensive to manufacture.

In accordance with the present invention, a combination pressure regulating and cartridge piercing assembly is provided comprising an elongated body having a longitudinal passageway therethrough and a transverse wall which divides the passageway into first and second chambers. Communication between the first and second chambers is provided by an opening in the transverse wall. Valve means acting on the opening regulates the flow of gases from the first chamber to the second chamber. At least one outlet conduit is provided in the body for conveying gases from the second chamber to a point exteriorly of the elongated body. Valve operating means is provided in the first chamber for opening and closing the valve means in response to the gas pressure within the second chamber so as to maintain the gas pressure in the second chamber at a preselected level. The valve operating means is adjustable to operate over a range of preselected pressure levels.

A cartridge piercing element is positioned within the first chamber to pierce a cartridge introduced therein. The piercing element is supported within the first chamber in a manner which will not restrict the flow of gases through the chamber. The end of the elongated body adjacent to the first chamber is adapted for connection to a housing containing a compressed gas cartridge of the pierceable type, such as, for example, a conventional $CO_2$ cartridge. The overall arrangement is such that as the assembly of the invention is connected to the housing, the cartridge is automatically pierced to discharge compressed gases into the longitudinal passageway. The valve operating means and the valve means cooperate to maintain the pressure of gases within the second chamber at a preselected level. The outlet conduit provided in the elongated body communicates with additional conduits provided in the housing which, in turn, convey the compressed gas to the interior of a vessel containing a fluid which is to be dispensed.

The above and other objects and advantages of the present invention will become apparent from the following detailed description by reference to the accompanying drawings, in which.

Figure 1:
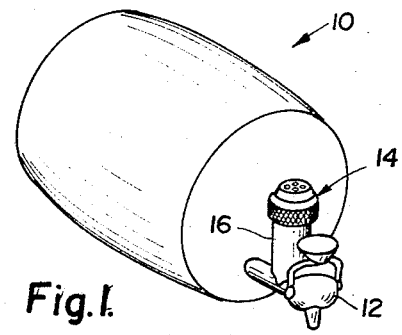
FIGURE 1 is an isometric view of a fluid dispensing vessel incorporating the present combined pressure regulating and cartridge piercing assembly.

Referring now to FIG. 1, there is illustrated a fluid dispensing vessel 10 provided with a tap 12 incorporating a combined pressure regulating and cartridge piercing assembly 14 of the invention. The tap 12 includes a cylindrical housing 16 which, as will be more fully explained later in the specification, contains a compressed gas cartridge of the pierceable type. The cartridge supplies gas under pressure to the interior of the vessel 10 for the purpose of dispensing the liquid contained in the vessel 10. The combined pressure regulating and cartridge piercing assembly 14 of the invention is threaded into the cylindrical housing 16. The connection of the present combined pressure regulating and cartridge piercing assembly 14 with the cylindrical housing 16 automatically pierces the cartridge contained within the housing 16 and thereafter maintains the level of pressure within the vessel 10 at a preselected level.

Figure 2:
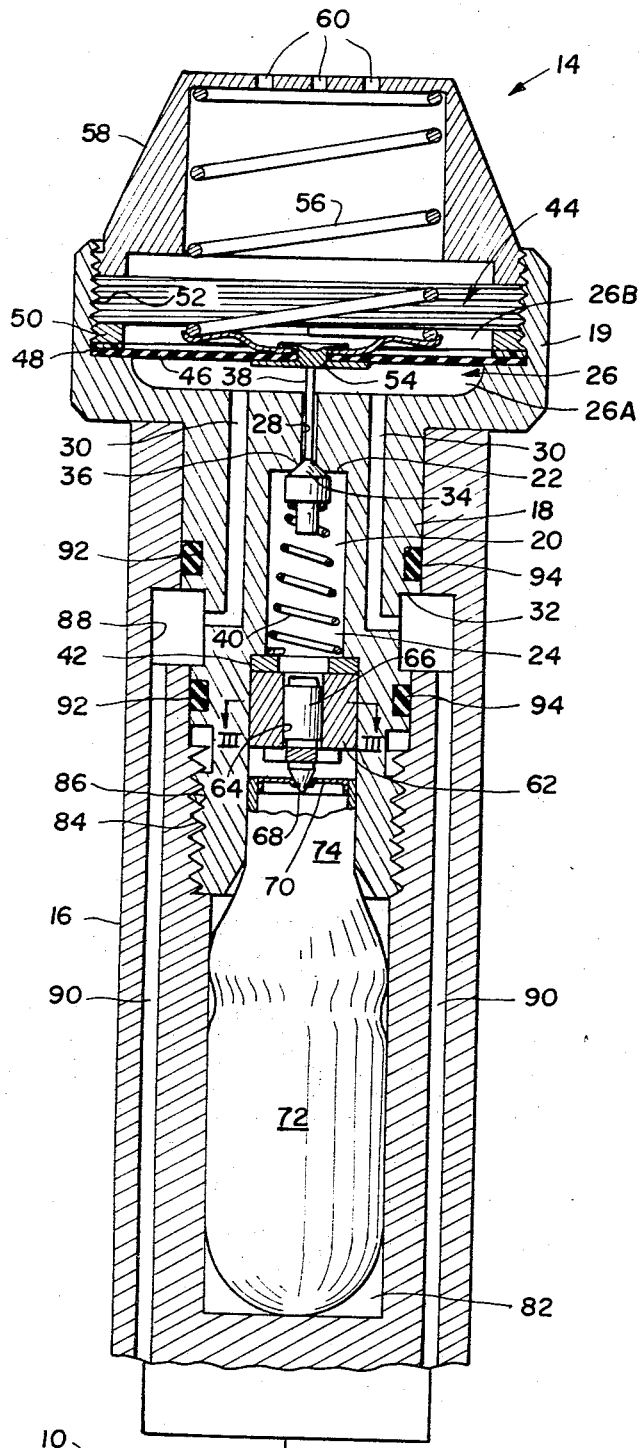
FIG. 2 is a cross-sectional view taken substantially through the combined pressure regulating and cartridge piercing assembly of the invention.

Reference is now directed to FIG. 2 wherein one arrangement of the present combined pressure regulating and cartridge piercing assembly 14 is illustrated. The assembly 14 comprises an elongated body 18 having an enlarged end 19 and a longitudinal bore 20 extending therethrough. A transverse wall 22 divides the longitudinal bore 20 into first and second chambers 24, 26. The transverse wall 22 has an opening 28 which provides communication between the first and second chambers 24, 26. At least one and preferably a plurality of outlet conduits 30 are provided in the elongated body for conveying gases from the second chamber 26 to a point exteriorly of the elongated body, such as, the peripheral groove 32.

In order to regulate the flow of fluids from the first chamber 24 into the second chamber 26, valve means is provided comprising a plug 34 adapted to engage a valve seat 36 provided in the opening 28. A valve operating stem 38 projects from the plug 34 through the opening 28 and into the second chamber 26. A spring 40 is interposed between the plug 34 and a washer-like element 42. It should be evident that depression of the valve operating stem 38 will cause the plug 34 to be displaced away from the valve seat 36, thereby permitting gases to flow through the opening 28 and into the second chamber 26.

In order to maintain a substantially constant gas pressure within the second chamber 26 and, hence, within the vessel 10 (FIG. 1), the second chamber 26 is provided with pressure regulating means 44 which is engageable with the valve operating stem 38 to displace the plug 34 toward and away from the valve seat 36. The pressure regulating means 44 comprises a resilient diaphragm 46 which extends transversely across the second chamber 26, thereby dividing the same into second chamber portions 26A and 26B. The peripheral edges of the resilient diaphragm 46 are clamped between a shoulder 48 provided in the elongated body 18 and a ring member 50 which is threaded into an internally threaded end bore 52 of the elongated body 18. A reinforcing member 54 is provided at a central location on the diaphragm 46, which engages the valve operating stem 38 on one side of the diaphragm 46 and also serves as a cup member for retaining the end of a spring 56 interposed between the reinforcing member 54 and a cap member 58. The cap member 58 is provided with a plurality of openings 60 which subject the second chamber portion 26B to atmospheric pressure. Consequently, at a preselected pressure level, the pressure of the gases within the second chamber portion 26A exerts a force on the diaphragm 46 which is opposed by the combined forces exerted on the diaphragm by the spring 56 and the atmospheric pressure. When it is desired to increase the pressure level within the second chamber portion 26A, the cap member 58 is displaced toward the diaphragm 46, thereby increasing the compression of the spring 56. Conversely, when it is desired to decrease the preselected pressure level within the second chamber portion 26A, the cap member 58 is moved away from the diaphragm 46, thereby decreasing the amount of compression in the spring member 56.

Figure 3:
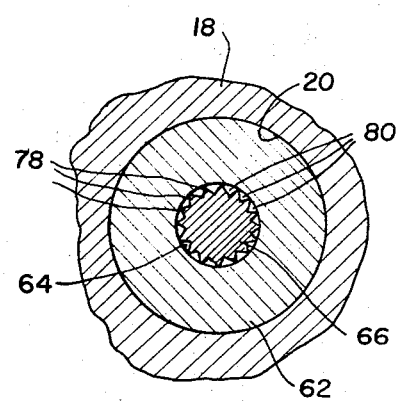
FIG. 3 is a cross-sectional view taken along the line III—III of FIG. 2.

Referring now to FIGS. 2 and 3, upstream of the plug 34, that is, within the first chamber 24, there is provided a tubular element 62 engaged with the washer-like element 42 and provided with a central opening 64. Wedged into the central opening 64 is a cylindrical element 66 having a pointed end 68. As shown in FIG. 2, the pointed end 68 has pierced a relatively thin top wall 70 of a compressed gas cartridge 72 to discharge the compressed gases therein. The cartridge 72 has a neck portion 74 which is insertable into the first chamber 24.

In order that compressed gas will flow between the cylindrical element 66 and the central opening 64, the cylindrical element 66 is preferably formed with a plurality of serrations 78, such as shown in FIG. 3. The serrations 78 cooperate with the central opening 64 to define a plurality of longitudinal openings 80 through which the compressed gas flows.

Referring again to FIG. 2, the cartridge 72 is received within a bore 82 provided in the housing 16. The elongated body 18 has a threaded end 84 which is threaded into an internally threaded portion 86 of the housing 16. It should be noted that as the elongated body 18 is connected to the housing 16, the pointed end 68 of the cylindrical element 66 automatically punctures the cartridge 72 to release the gas therein.

When the cartridge 72 is punctured, compressed gas will flow through the longitudinal openings 80 to the opening 28. Initially, the plug 34 is displaced from the valve seat 36. However, as the pressure level rises within the second chamber portion 26A, it will exert a force on the resilient diaphragm 46 in opposition to the spring member 56. Thereafter, the diaphragm 46 will be displaced away from the opening 28 until such time as the plug 34 is seated against the valve seat 36, thereby closing off the opening 28 to further passage of compressed gas.

Initially, then, gas flows through the opening 28 into the second chamber portion 26A through the outlet conduits 30 into the peripheral groove 32. In order to convey the compressed gas from the combined pressure regulating and cartridge piercing assembly 14 to the vessel 10, for example, the housing 16 is provided with a peripheral groove 88 corresponding to the peripheral groove 32. At least one, and preferably a plurality of, longitudinally extending conduits 90 are provided in the housing 16 which convey the gases to the fluid dispensing vessel 10. A specific means for conveying the compressed gases from the conduits 90 into the vessel 10 is believed to be within the skill of the art and therefore has been schematically illustrated.

In order to prevent the compressed gas from flowing between the outer surface of the elongated body 18 and the interior surface of the housing 16, annular grooves 92 are provided, one on each side of the annular groove 32. Annular sealing elements, such as O-rings 94, are provided in the annular grooves 92 to prevent the escape of compressed gases.

Figure 4:
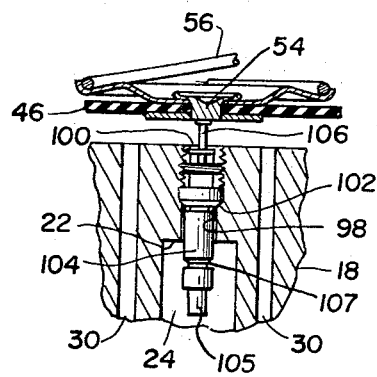
FIG. 4 is a fragmentary cross-sectional view illustrating an alternative embodiment of a valve means employed in the present assembly.

Reference is now directed to FIG. 4 wherein an alternative embodiment of the valve means is illustrated. As can be seen in FIG. 4, the transverse wall 22 is provided with an opening 98 having a threaded upper portion 100 and a conical seat 102. The opening 98 is adapted to receive a conventional tire valve gut 104 having a valve operating stem 106 engaged with the reinforcing member 54 on the diaphragm 46. The tire valve gut 104 engages the conical seat 102 to seal the opening 98. The tire valve gut 104 is preferred since it is a unitary valve structure which may be readily installed within the elongated body 110. Furthermore, the tire valve gut 104 is a readily available and relatively inexpensive item of manufacture. As is known, the valve 105 of the gut 104 is normally held in engagement with a seat 107 by means of an internal tension spring, not shown. The valve 105 is connected to the stem 106 such that upon downward movement of the stem, valve 105 will become unseated from seat 107 against the force of the aforesaid tension spring.

Figure 5:
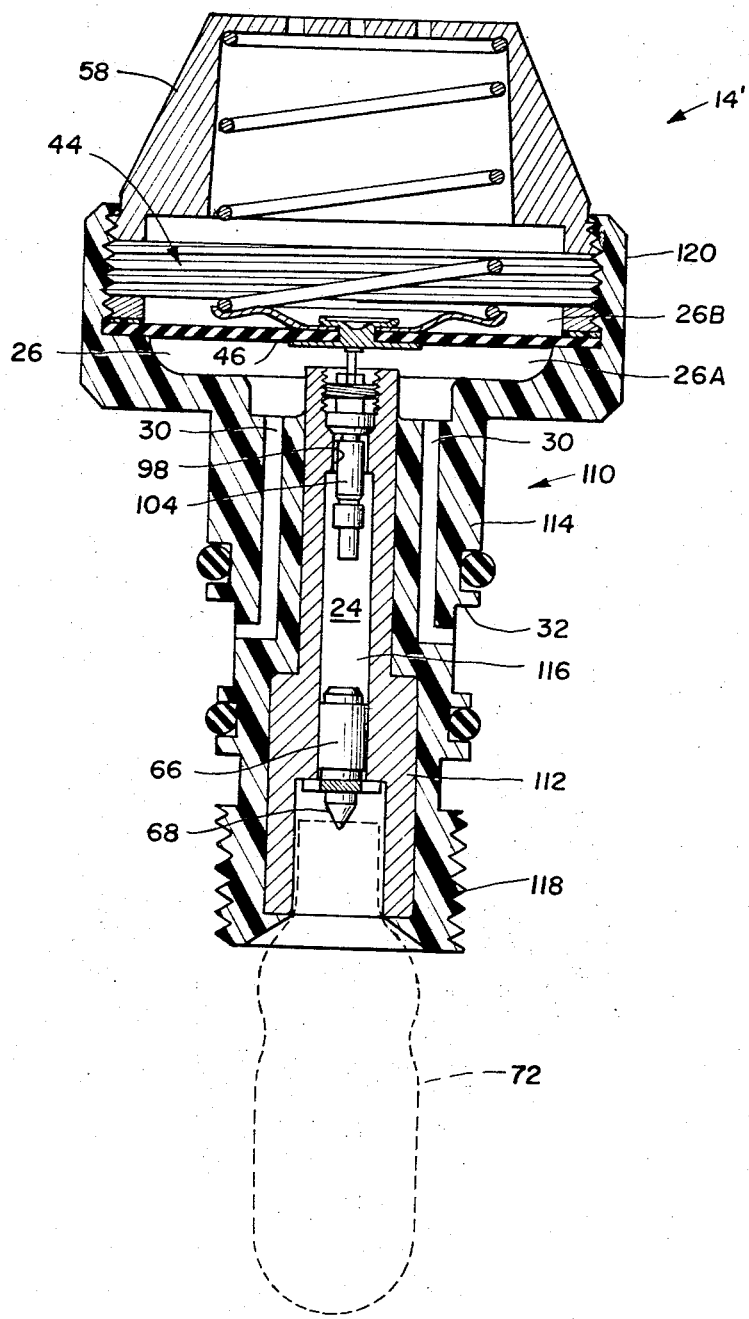
FIG. 5 is a cross-sectional view, similar to FIG. 2, illustrating an alternative embodiment of the present combined pressure regulating and cartridge piercing assembly.

Reference is now directed to FIG. 5 wherein an alternative embodiment of the present combined pressure regulating and cartridge piercing assembly is illustrated. In FIG. 5, the assembly is indicated generally by the numeral 14'. The construction of the assembly 14' is similar to the construction of the assembly 14. Accordingly, corresponding numerals will be employed to identify corresponding parts heretofore described.

The combined pressure regulating and cartridge piercing assembly 14' has an elongated body 110 comprising a metal insert 112 having a plastic outer shell 114 molded about the metal insert 112. The metal insert 112 may be formed, for example, from aluminum and has a longitudinal passageway 116 corresponding to the aforesaid first chamber 24. Carried within the longitudinal passageway 116 is the cylindrical element 66 provided with the pointed end 68 which is adapted to pierce a compresser gas cartridge 72 (shown in dotted outline) inserted within one end of the metal insert 112. The opposite end of the metal insert 112 is provided with the opening 98 having a conventional tire valve gut 104 threaded therein.

The plastic outer shell 114 preferably is formed from polyvinylfluoride although other suitable plastics may be used. The plastic outer shell 114 has a threaded lower end 118 adapting the elongated body 110 for connection to a housing containing the cartridge 72 and has an enlarged opposite end portion 120 which cooperates with the cap memebr 58 to define the aforesaid second chamber 26. The pressure regulating means 44 is provided within the second chamber 26. The diaphragm 46 of the pressure regulating means 44 divides the second chamber 26 into second chamber portions 26A and 26B. At least one, and preferably a plurality of, outlet conduits 30 are provided in the plastic outer shell 114 for conveying compressed gases from the second chamber portion 26A to a point exteriorly of the plastic shell 114 such as, for example, the peripheral groove 32. Operation of the combined pressure regulating and cartridge piercing assembly 14' is identical to the operation of the combined pressure regulating and cartridge piercing assembly 14, already described.

A comparison of FIGS. 2 and 5 will reveal that the external configuration of the elongated body 18 (FIG. 2) is identical to the external configuration of the elongated body 110 (FIG. 5). Furthermore, the enlarged end portion 19 of the elongated body 18 is similar to the enlarged end portion 120 of the elongated body 110. Since the elongated body 18 of FIG. 2 is formed from metal, a considerable amount of machining is required to form the various cylindrical surfaces, the grooves 32 and 92, as well as the threading on the lower end 84. Therefore, manufacture of the elongated body 18 is relatively expensive.

The advantage of the embodiment illustrated in FIG. 5, resides, therefore, in the manner of constructing the elongated body 110. That is to say, to make the metal insert 112, a minimum amount of machining is required, while, on the other hand, the plastic outer shell 114 requires no machining since it is a molded product. Furthermore, manufacturing costs are further reduced by molding the plastic outer shell 114 directly about the metal insert 112. When the molding operation is completed, an elongated body 110 is produced which is immediately ready to receive the remaining components of the assembly 14'.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In combination, an elongated housing having a cavity therein for receiving a compressed gas cartridge, at least one conduit in the wall of said housing extending parallel to and adjacent said cavity, threads surrounding a portion of said cavity, a combined pressure regulator and cartridge piercing unit comprising an elongated body threadedly received within said cavity, a longitudinal passageway in said unit adapted to receive compressed gas from said cartridge, a wall extending transversely of said longitudinal passageway and dividing the same into a first chamber and a second chamber, said transverse wall having an opening therethrough providing communication between said first and second chambers, at least one outlet conduit in said elongated body connecting said second chamber to said conduit in the wall of said housing, means in said first chamber for piercing said cartridge when the pressure regulator and cartridge piercing unit is threaded into said cavity, valve means for controlling the flow of gases from said first chamber into the second chamber through the opening in said transverse wall, and means in said second chamber for operating said valve means to regulate the flow of gases into said second chamber in response to the pressure of gases within said second chamber.

2. The combination as defined in claim 1 wherein said valve means includes a valve operating stem projecting through said opening into said second chamber and a valve plug biased into engagement with a valve seat for sealing said opening.

3. The combination as defined in claim 1 wherein said valve operating means comprises a diaphragm extending transversely of said second chamber and engaged with said valve means, a closure member for closing said second chamber, and resilient means interposed between said closure member and said diaphragm for urging said diaphragm against the pressure exerted by gases within that portion of said second chamber bounded by said wall and said diaphragm.

4. The combination as defined in claim 1 wherein said elongated body of the combined pressure regulator and cartridge piercing unit comprises a metal core defining said first chamber of said longitudinal passageway and a plastic outer shell molded about said metal core and extending therebeyond to define said second chamber.

5. The combination as defined in claim 1 wherein a portion of said opening is threaded and said valve means comprises a tire valve gut threaded therein.

6. The combination as defined in claim 1 wherein said elongated body includes a peripheral groove at an intermediate location thereon, at least one outlet passageway in said elongated body for conveying gases from said second chamber to said peripheral groove, and sealing elements encircling said elongated body and positioned on either side of said peripheral groove.

References Cited

UNITED STATES PATENTS

| | | | |
|---|---|---|---|
| 1,561,367 | 11/1925 | Spreen | 137—505.42 X |
| 2,016,113 | 10/1935 | Lambert et al. | 222—5 |
| 2,571,433 | 10/1951 | Fine et al. | 222—399 X |
| 2,812,109 | 11/1957 | Wentz | 222—399 X |
| 2,822,002 | 2/1958 | Mack | 222—399 X |
| 3,039,661 | 6/1962 | Wentz et al. | 222—396 |
| 3,127,059 | 3/1964 | Lawrence et al. | 222—399 X |
| 3,269,598 | 8/1966 | Butters et al. | 222—5 |

RAPHAEL M. LUPO, *Primary Examiner.*